US012640622B1

(12) United States Patent
Egeland et al.

(10) Patent No.: US 12,640,622 B1
(45) Date of Patent: May 26, 2026

(54) SYSTEMS AND METHODS FOR POWER GENERATION IN A COMBINED CYCLE UTILIZING A GEOBARIC EXPANDER AND A COMBUSTION TURBINE

(71) Applicant: CNX Resources Corporation, Canonsburg, PA (US)

(72) Inventors: Kevin Robert Egeland, Pittsburgh, PA (US); Joseph Michael Fink, Washington, PA (US)

(73) Assignee: CNX Resources Corporation, Canonsburg, PA (US)

( * ) Notice: Subject to any disclaimer, the term of this patent is extended or adjusted under 35 U.S.C. 154(b) by 0 days.

(21) Appl. No.: 19/048,302

(22) Filed: Feb. 7, 2025

(51) Int. Cl.
| | |
|---|---|
| *H02K 7/18* | (2006.01) |
| *F02C 6/00* | (2006.01) |
| *F02C 7/22* | (2006.01) |

(52) U.S. Cl.
CPC .............. *H02K 7/1823* (2013.01); *F02C 6/00* (2013.01); *F02C 7/22* (2013.01); *H02K 7/1815* (2013.01); *F05D 2220/76* (2013.01)

(58) Field of Classification Search
CPC ...... H02K 7/1823; H02K 7/1815; F02C 6/00; F02C 7/22; F05D 2220/76
See application file for complete search history.

(56) References Cited

U.S. PATENT DOCUMENTS

| | | | |
|---|---|---|---|
| 2019/0257245 A1* | 8/2019 | Duge ........................ | F02C 1/04 |
| 2024/0305107 A1* | 9/2024 | Fernando ................ | H02J 3/381 |

* cited by examiner

*Primary Examiner* — Joseph Ortega
(74) *Attorney, Agent, or Firm* — K&L Gates LLP

(57) ABSTRACT

This disclosure relates to a system and method for generating power from a high-pressure gas stream. The system includes a combustion engine, such as a gas turbine, which generates power and exhaust gas. A heat exchanger utilizes this exhaust gas to heat the high-pressure gas stream. The heated gas is then expanded through an expander, like an expansion turbine, to a lower pressure, generating additional power. The system may incorporate a fuel conditioning system and can drive an electric generator. It also features a second combustion engine and expander for further efficiency. The method involves generating power, heating the gas stream, and expanding it to a lower pressure, with options for injecting a hydrate inhibitor and removing water vapor. This approach enhances the efficiency of gas turbines by utilizing exhaust heat and expanding gas streams to maximize power output.

19 Claims, 11 Drawing Sheets

SYSTEMS AND METHODS FOR POWER GENERATION IN A COMBINED CYCLE UTILIZING A GEOBARIC EXPANDER AND A COMBUSTION TURBINE

TECHNICAL FIELD

The present disclosure relates to systems and methods for power generation systems, and more specifically to a combined cycle system utilizing a geobaric expander and a combustion turbine, such as a gas turbine, for enhanced power generation efficiency.

BACKGROUND

Conventional methods for managing high-pressure natural gas often involve reducing the pressure to match pipeline levels, which wastes energy and can cool the gas, leading to hydrate formation. This requires additional heating to maintain flow. Gas turbines, used for distributed power generation, have low efficiency due to their open Brayton cycle, resulting in high exhaust temperatures and energy loss. Geobaric power generation, which expands high-pressure gas to pipeline pressure, faces challenges due to the low energy content of the gas. Expanding these gases can cause temperatures to drop below safe levels for equipment or lead to hydrate formation, requiring costly drying and reheating processes. Traditional solutions limit the expander pressure ratio, leaving potential energy untapped. The low enthalpy of high-pressure gases at low temperatures restricts energy extraction, necessitating innovative solutions. The present disclosure combines a gas turbine and geobaric expander in a combined cycle to address these issues, improving efficiency and energy recovery.

The generation of power from the expansion of wellhead gases, a process referred to as geobaric power generation, presents challenges due to the low enthalpy of the wellhead gas streams. Expanding high-pressure wellhead gas to pipeline pressure can result in outlet temperatures below the minimum design metal temperature (MDMT) of downstream equipment. Water-saturated wellhead gas can form clathrate hydrates at temperatures higher than the MDMT, clogging equipment. Conventional solutions involve limiting the expander pressure ratio, which leaves potential geobaric power unharnessed, or dehydrating the wellhead gas and rewarming the expander outlet gas, resulting in a complex and expensive process. Gas turbines, commonly used for distributed power generation, operate on an open Brayton cycle and have low efficiencies, typically no more than 33%, even with optimized recuperators. This low efficiency is reflected in their relatively warm exhaust gas temperatures. These challenges are addressed by combining a gas turbine and a geobaric expander in a combined cycle configuration.

SUMMARY

In various embodiments, the present disclosure addresses the limitations of conventional methods by combining a geobaric expander with a combustion turbine in a novel combined cycle configuration. This system captures the energy otherwise lost in the exhaust of the combustion turbine and uses it to preheat the high-pressure gas stream entering the geobaric expander. This preheating counteracts the temperature drop associated with expansion, reducing the risk of hydrate formation and enabling a greater pressure drop across the expander, thereby maximizing power generation.

In one embodiment, the system includes a combustion turbine, a heat exchanger, and a geobaric expander. The combustion turbine burns a fuel, such as a portion of the produced natural gas, generating both electrical power and hot exhaust gas. The hot exhaust gas is then directed into the heat exchanger, where it transfers heat to the high-pressure gas stream from the wellhead. This preheated gas stream is then expanded in the geobaric expander to generate additional electrical power. The expander outlet gas, now at pipeline pressure and a suitable temperature, is discharged into the pipeline.

This combined cycle approach significantly improves the fuel efficiency of the system compared to using a gas turbine alone. The combine cycle approach effectively utilizes the waste heat from the combustion turbine, increasing the overall power output for a given fuel consumption or minimizing fuel consumption for a given power output.

The system for generating power from high-pressure wellhead gas combines a gas turbine and a geobaric expander in a combined cycle configuration. It utilizes the hot exhaust gas from the gas turbine to heat the high-pressure wellhead gas before expansion, thereby increasing the fuel efficiency. The heated gas stream is expanded in an expander to a substantially lower pressure and discharged into a pipeline. This configuration allows for a greater pressure ratio across the geobaric expander while avoiding the formation of clathrate hydrates or the need for extensive dehydration and rewarming processes. The gas turbine and the geobaric expander may each drive an electric generator, with the gas turbine using a portion of the gas as fuel. This combined cycle system achieves higher lower heating value (LHV) electrical efficiencies compared to conventional gas turbines and even rivals the efficiency of large-scale combined cycle gas turbines.

In one embodiment, the present disclosure describes a combined cycle system that significantly enhances the efficiency of power generation from high-pressure wellhead gas. The system integrates a gas turbine and a geobaric expander, utilizing the gas turbine's exhaust heat to preheat the wellhead gas before expansion. This preheating process mitigates the risk of hydrate formation and allows for a greater pressure ratio across the expander, maximizing power output. The system achieves high efficiency, potentially exceeding 100% LHV, and is adaptable to various wellhead conditions. By using gas or alternative fuels, the system offers flexibility and improved environmental performance, providing a cost-effective and efficient solution for geobaric power generation.

In one embodiment, the present disclosure addresses the limitations of geobaric power generation and gas turbine efficiency by combining the two in a novel combined cycle system. The system utilizes the hot exhaust gas from an internal combustion engine, such as a gas turbine, to heat a high-pressure gas stream before expansion. This preheating increases the enthalpy of the gas, allowing for a greater pressure drop and increased power generation while mitigating the risk of hydrate formation or exceeding MDMT limits. The system significantly improves the overall efficiency of power generation from wellhead gas, rivaling that of large-scale combined cycle turbines. The system offers a more environmentally friendly alternative to sending gas down the pipeline for power generation. This innovative combined cycle system offers a practical and efficient solution to the challenges of geobaric power generation, maximizing energy extraction while minimizing environmental impact. It presents a compelling alternative to conventional methods, offering enhanced efficiency and operational simplicity.

In one embodiment, the present disclosure describes a system for generating power from a high-pressure gas stream. A combustion engine generates power and exhaust gas. A heat exchanger receives the exhaust gas from the combustion engine and heats a high-pressure gas stream. An expander receives the heated high-pressure gas stream and expands the heated high-pressure gas stream to a lower pressure gas stream.

In one embodiment, the present disclosure describes a method of generating power from a high-pressure gas stream. The method includes generating power and exhaust gas using a combustion engine. The method includes heating the high-pressure gas stream using the exhaust gas from the combustion engine. The method includes expanding the heated high-pressure gas stream to a lower pressure gas stream using an expander.

In one embodiment, the present disclosure describes a system for increasing the efficiency of a gas turbine. The system includes a gas turbine to generate power and exhaust gas. A heat exchanger receives the exhaust gas from the gas turbine and to heat a high-pressure gas stream. An expansion turbine receives the heated high-pressure gas stream and to expand the heated high-pressure gas stream to a lower pressure gas stream, wherein the expansion turbine generates additional power.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
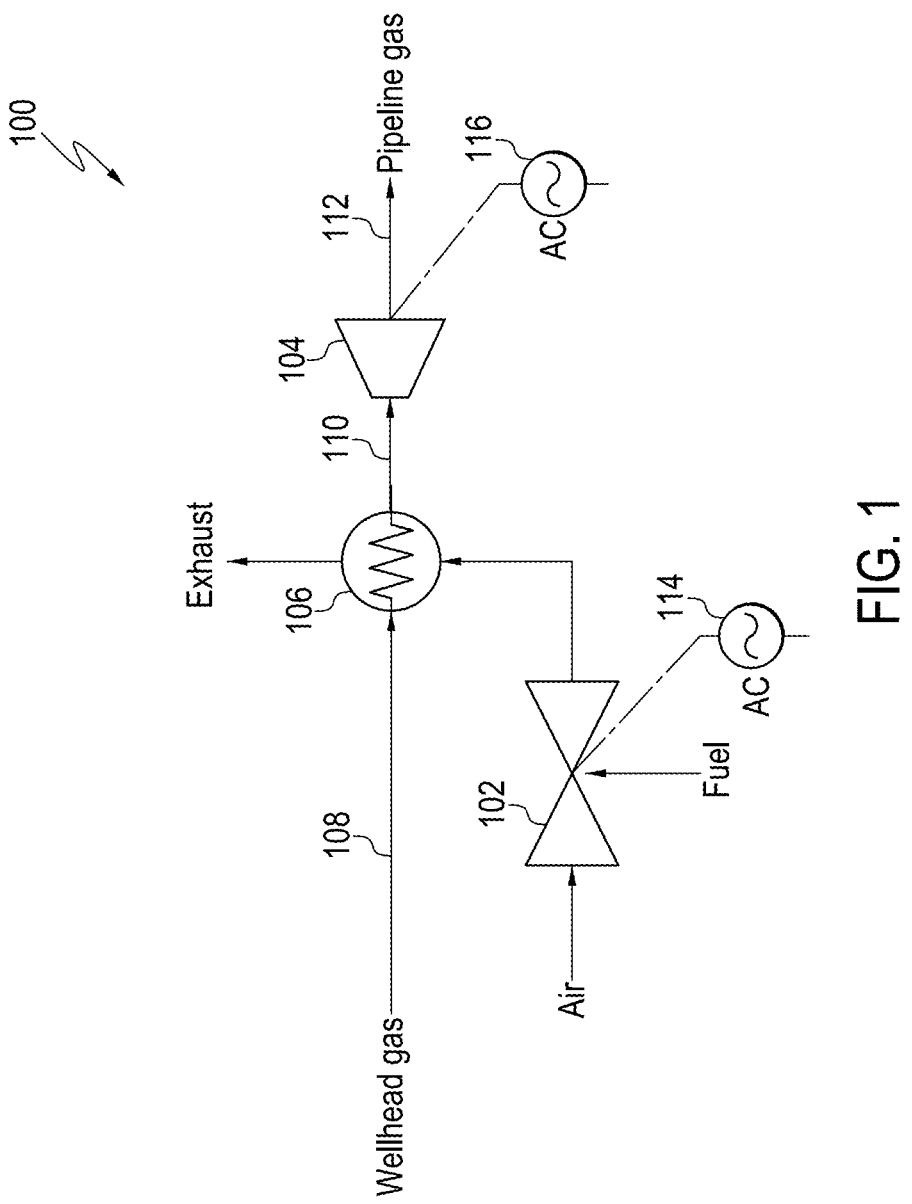

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates an embodiment of a system for harnessing the energy potential of high-pressure wellhead gases.

Figure 2:
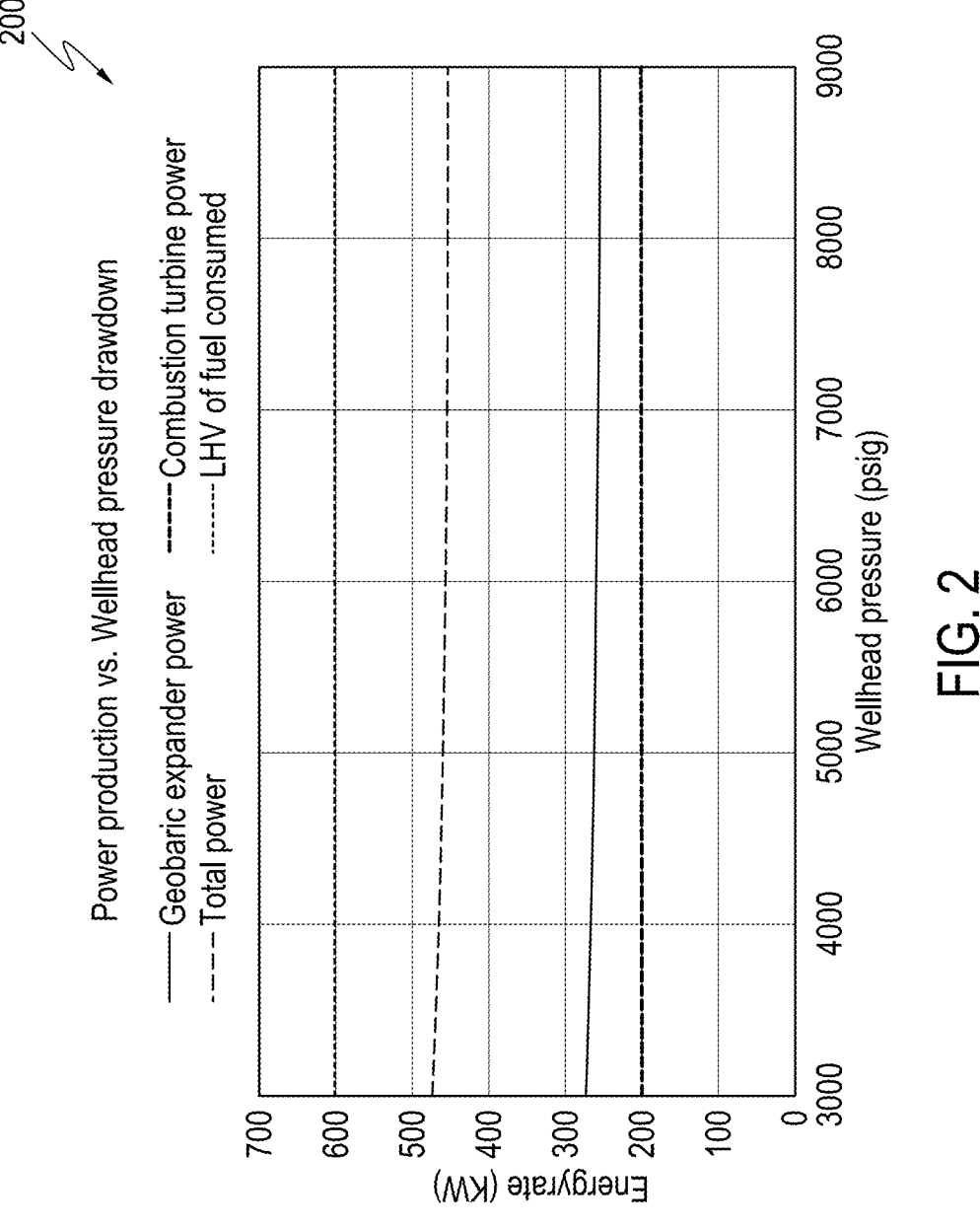

FIG. 2 is a graph showing power based on wellhead pressure drawdown.

Figure 3:
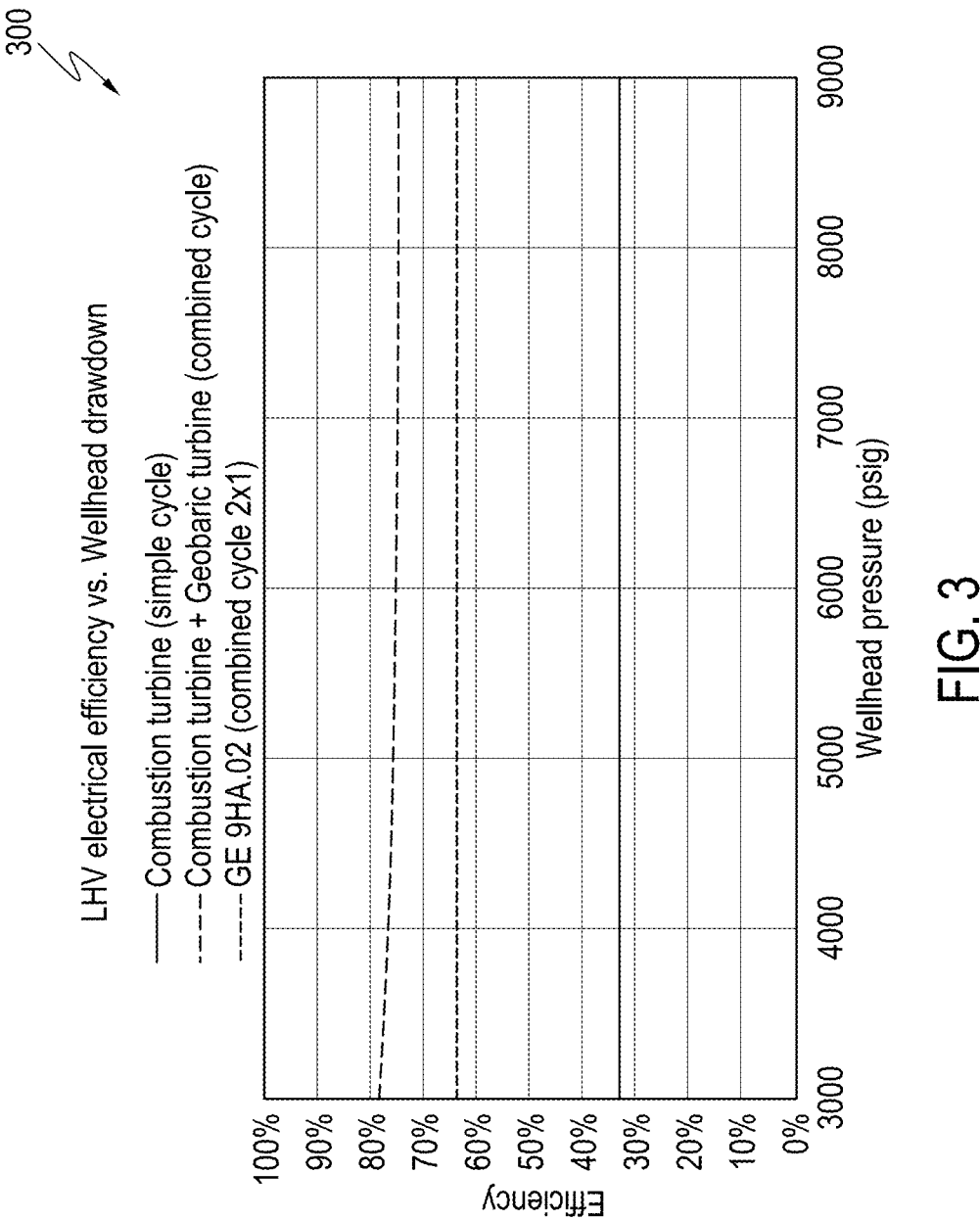

FIG. 3 is a graph showing lower heating value (LHV) electrical efficiency as a function of wellhead pressure drawdown.

Figure 4:
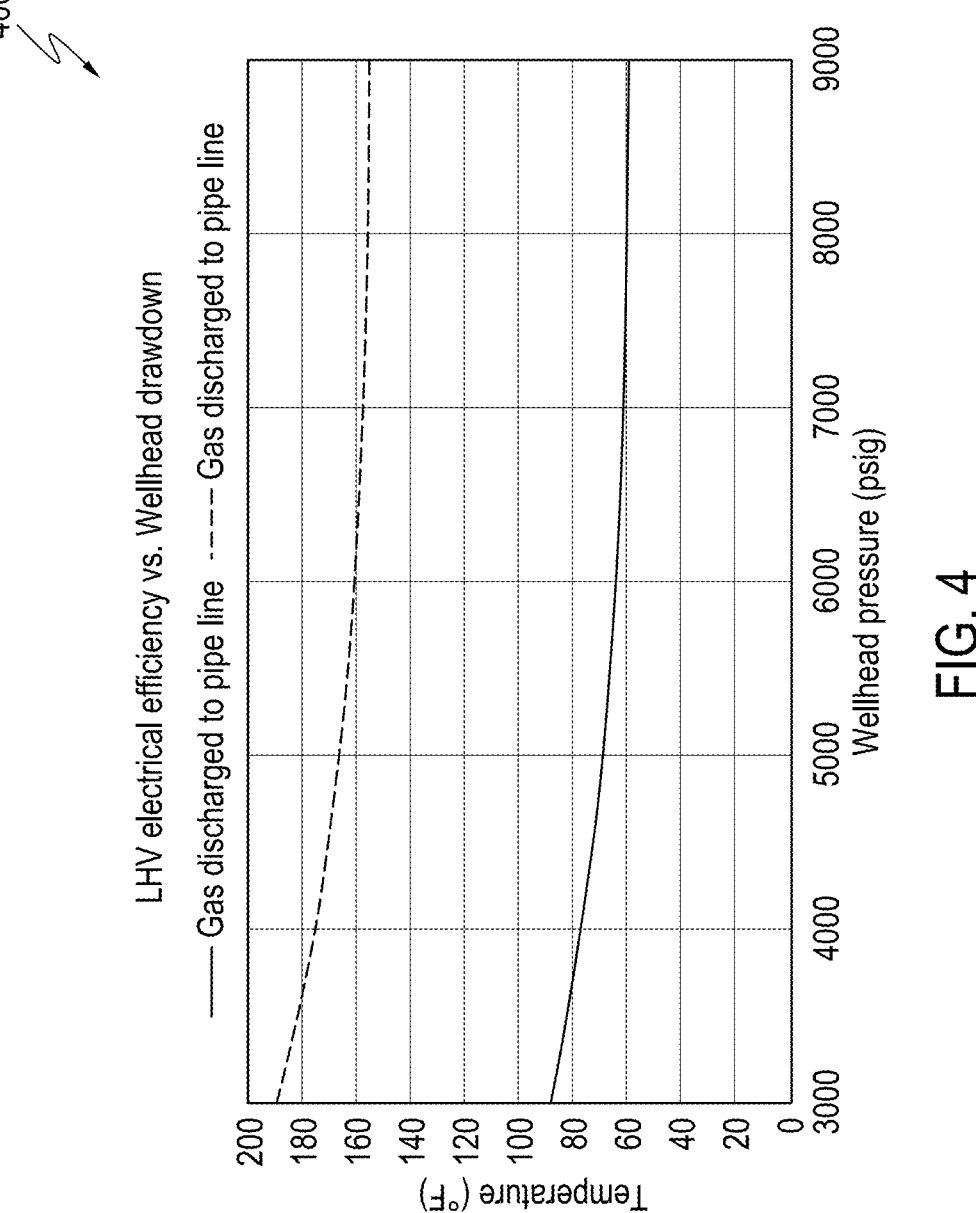

FIG. 4 is a graph showing outlet stream temperatures as functions of wellhead pressure drawdown.

Figure 5:
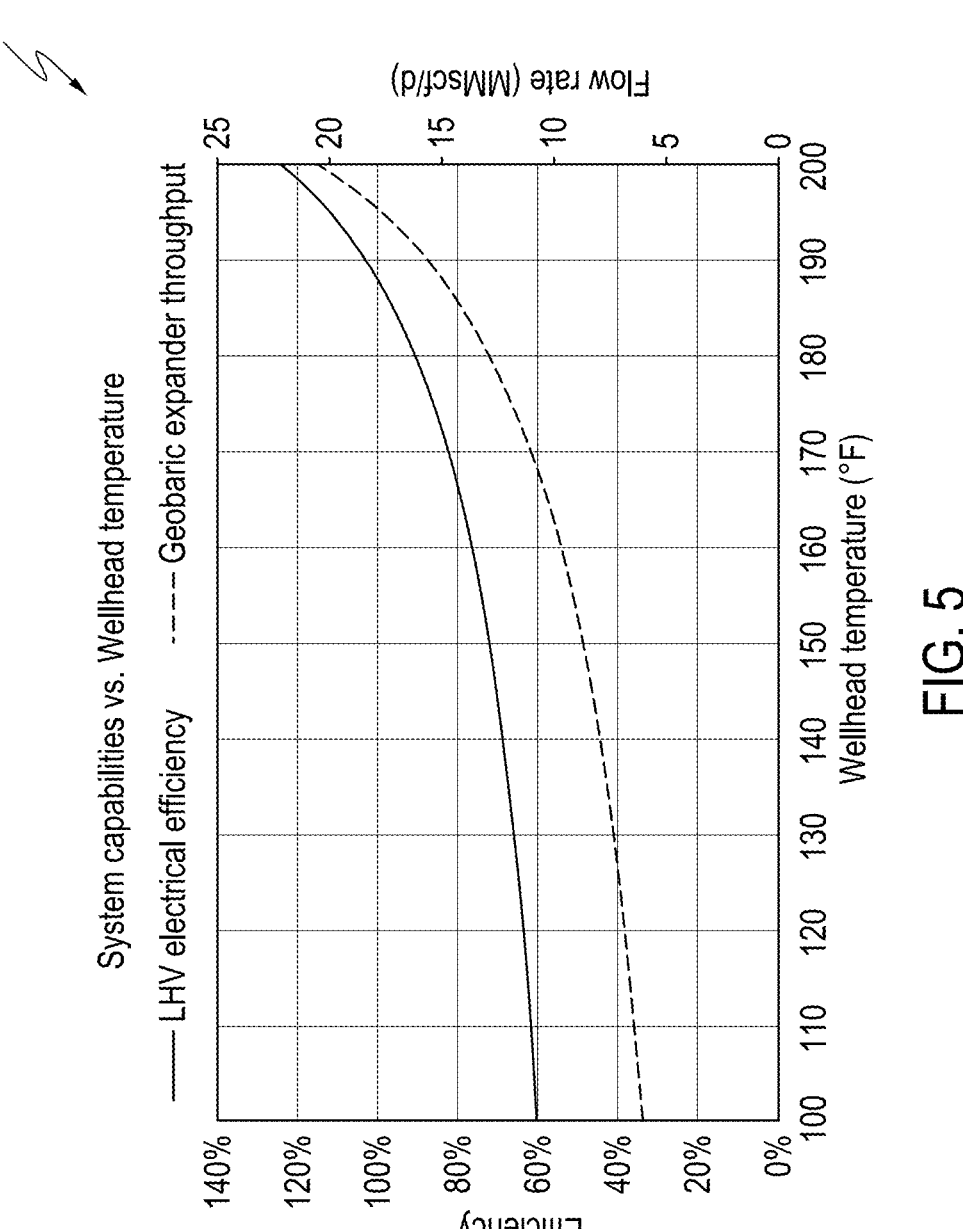

FIG. 5 is a graph showing the effect of wellhead temperature on maximum geobaric expander throughput and maximum time-averaged total LHV electrical efficiency.

Figure 6:
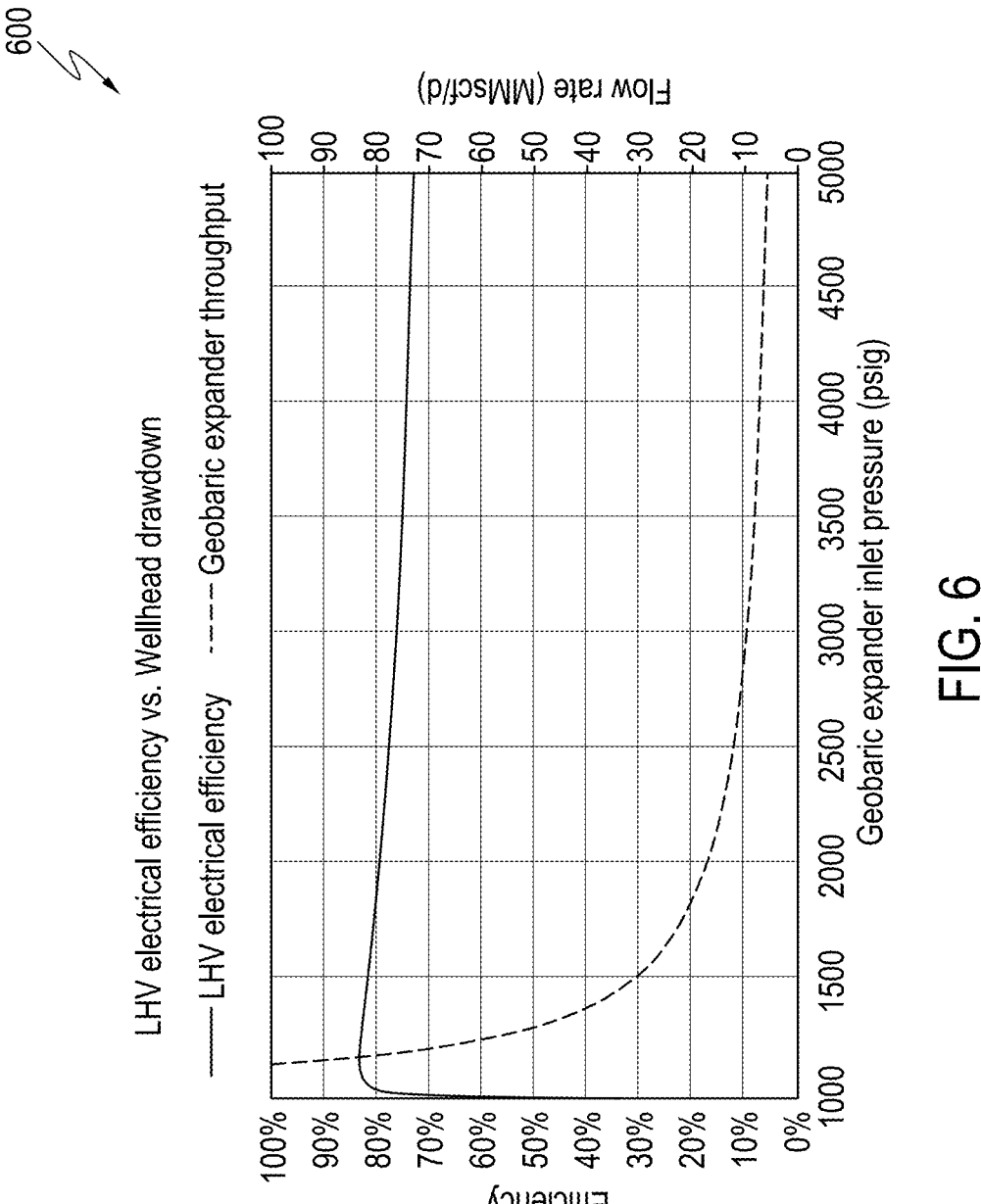

FIG. 6 is a graph showing the effect of geobaric expander inlet pressure on maximum geobaric expander throughput and maximum time-averaged total LHV electrical efficiency.

Figure 7:
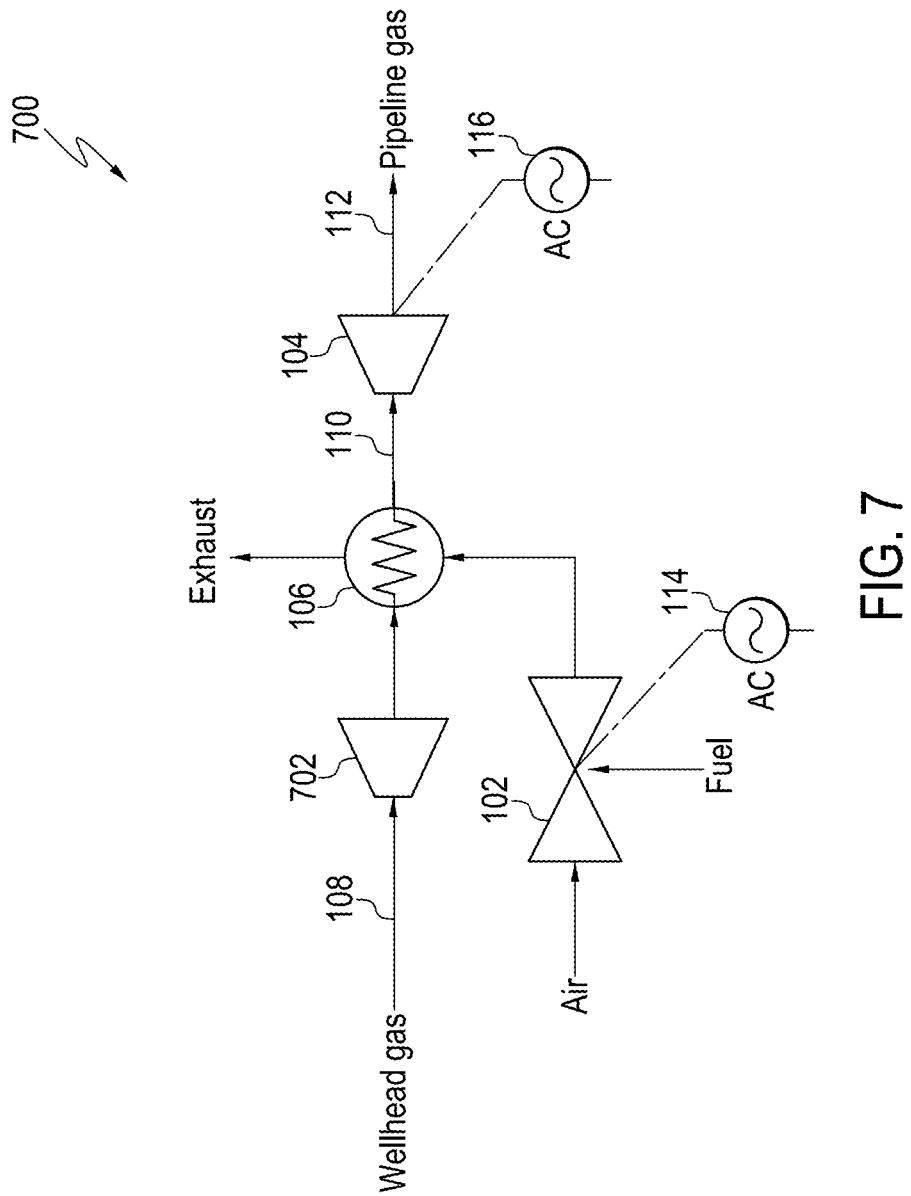

FIG. 7 illustrates an embodiment of a system for harnessing the energy potential of high-pressure wellhead gases using two geobaric expanders connected in series.

Figure 8:
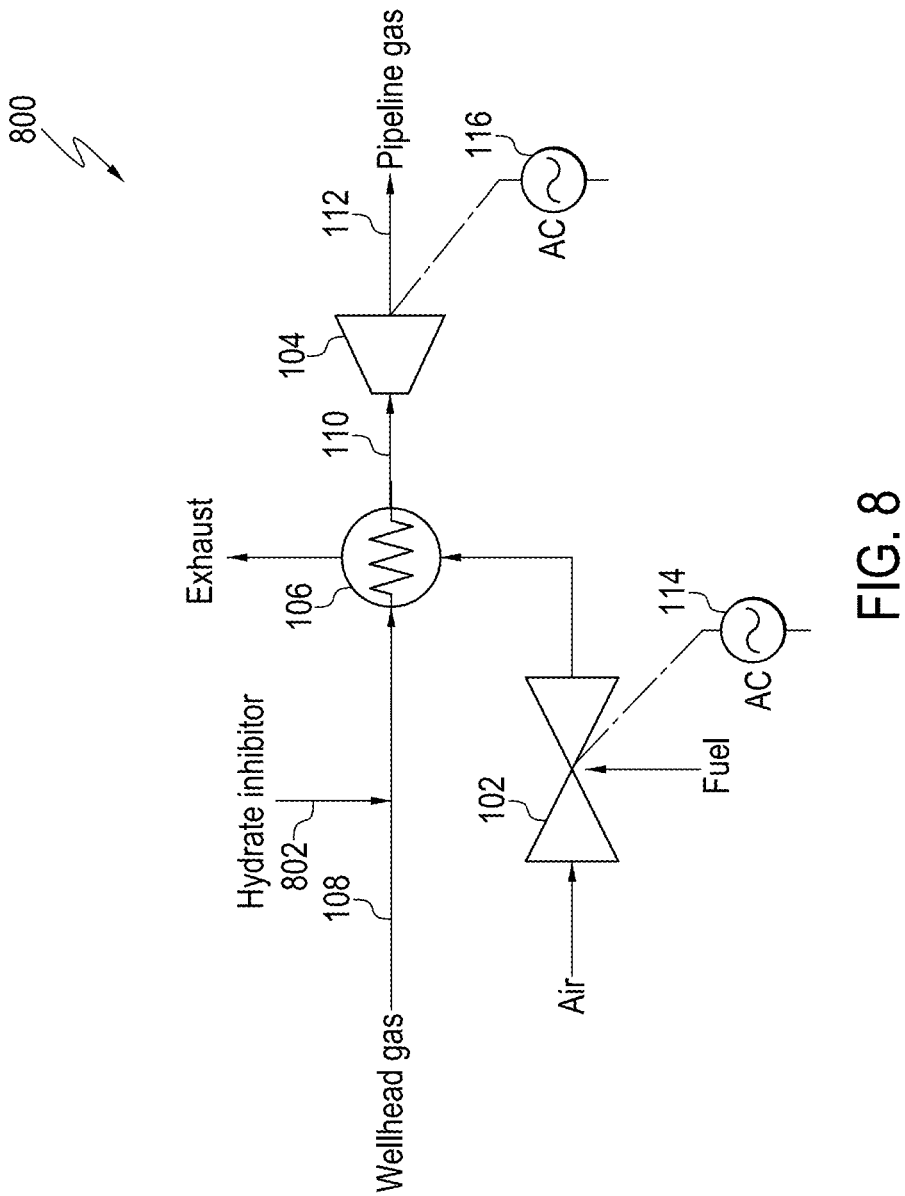

FIG. 8 illustrates an embodiment of a system for harnessing the energy potential of high-pressure wellhead gases that involves injecting a hydrate inhibitor into the gas stream.

Figure 9:
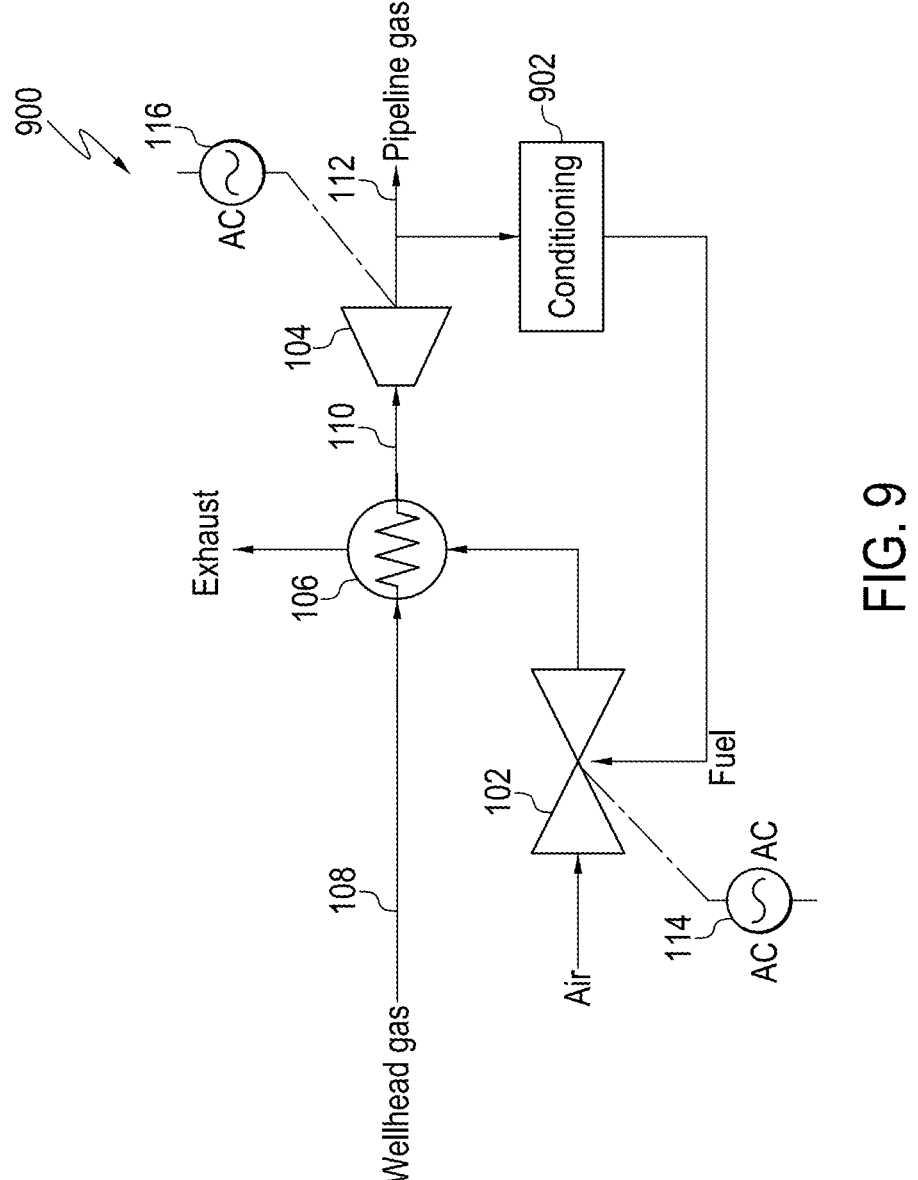

FIG. 9 illustrates an embodiment of a system for harnessing the energy potential of high-pressure wellhead gases that involves using pipeline gas as a fuel for the gas turbine.

Figure 10:
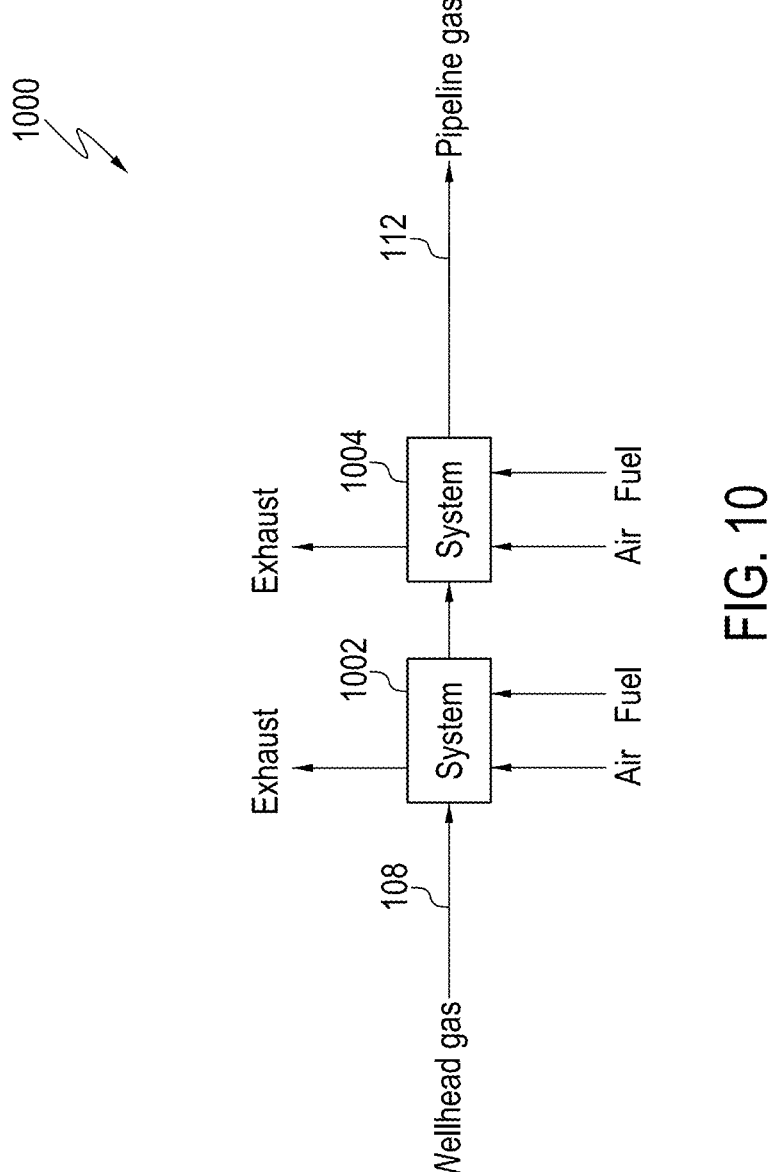

FIG. 10 illustrates an embodiment of a system arranging multiple systems in series on the same gas stream.

Figure 11:
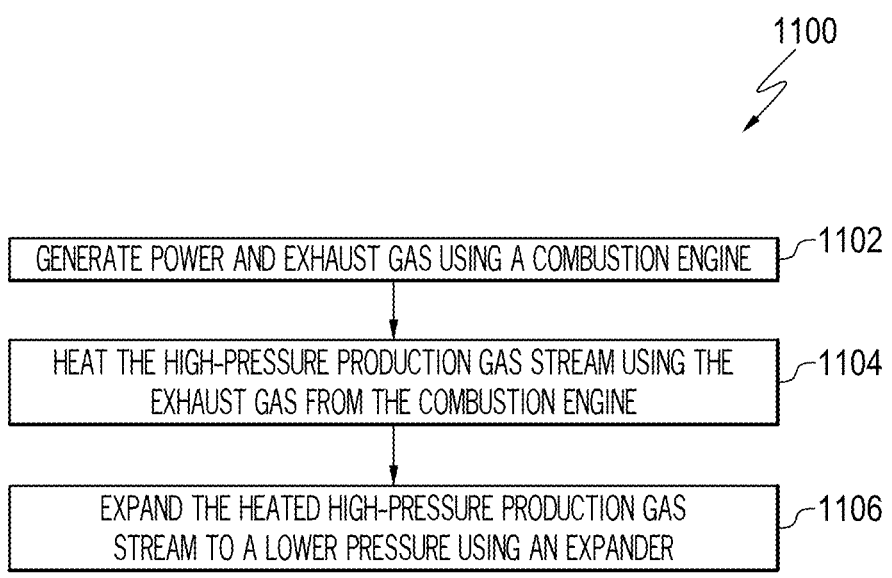

FIG. 11 is an embodiment of a method of generating power from a high-pressure gas stream.

DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

In the following description, it is to be understood that such terms as "forward," "rearward," "left," "right," "above," "below," "upward," "downward," and the like are words of convenience and are not to be construed as limiting terms.

The present disclosure addresses the challenge of efficiently generating power from the pressure letdown of wellhead gases, particularly in scenarios with high initial pressures like those encountered in Utica shale gas wells. These wells typically exhibit a substantial pressure differential between the wellhead (e.g., ~9000 psig) and pipeline pressures (e.g., ~1000 psig). Certain Utica shale gas wells, for example, can start at around 9000 psig and gradually decrease to 1000 psig over approximately two years. This contrasts with Marcellus shale gas wells, which might begin producing at 5000 psig and decline to pipeline pressure within five months. The theoretical geobaric power generated from a new Marcellus well is significantly less than a Utica well. The sustained high pressures of Utica wells present a greater opportunity for geobaric power generation. This disclosure describes a combined cycle approach that leverages the waste heat from a gas turbine to preheat the high-pressure gas stream, thereby enhancing the overall efficiency of power generation.

In one aspect, the high-pressure gas stream may be a high-pressure production gas stream. In natural gas wells, a "production gas stream" refers to the mixture of gases that is extracted from the well during the production phase. It typically contains natural gas as the primary component, along with other hydrocarbons (such as methane, ethane, propane, butane) and potentially non-hydrocarbon gases like carbon dioxide ($CO_2$), nitrogen ($N_2$), hydrogen sulfide ($H_2S$), and water vapor. This stream flows from the wellhead and is sent to processing facilities, where impurities and other non-valuable gases may be removed to obtain the desired product—usually methane, which is the main component of natural gas used for energy production and industrial applications. The composition of the production gas stream can vary depending on the reservoir's characteristics, and sometimes it requires additional treatment before it can be marketed or used.

A key challenge in geobaric power generation is the low enthalpy of high-pressure gas streams. Expanding such streams across a significant pressure differential can lead to undesirably low outlet temperatures, increasing the risk of hydrate formation, which can impede pipeline operations. Conventional solutions, such as limiting the expander pressure ratio or implementing complex and costly dehydration processes, harness very little of the theoretically available geobaric power or are prohibitively expensive. The present disclosure describes systems and methods to overcome these limitations by integrating a gas turbine with a geobaric expander in a combined cycle configuration. This approach addresses the low enthalpy issue of high-pressure gas by preheating the gas using the gas turbine exhaust. A key challenge in geobaric power generation is the significant temperature drop during expansion, which can lead to hydrate formation or require the gas to be dried to a very low water content using, for example, a large and expensive temperature-swing adsorption process. The systems and methods described herein avoid these issues by using the gas turbine's exhaust heat to raise the temperature of the wellhead gas before it enters the expander.

In one embodiment, the gas turbine may be a microturbine. While both gas turbines and microturbines operate on similar principles of converting energy from combustion into mechanical energy and subsequently electrical energy, the main differences are in their scale, output, efficiency, and applications. Gas turbines may be employed in industrial-scale energy production, whereas microturbines may be employed in smaller more distributed systems. The term "gas turbine" will be used throughout this description to refer to any suitable gas turbine or microturbine.

In various embodiments, the present disclosure describes systems for geobaric power generation is a low enthalpy high-pressure gas streams. The specific operating parameters, such as expander inlet pressure and flow rate, can be optimized based on wellhead conditions and economic considerations.

In one embodiment a gas turbine is paired with a geobaric expander. The gas turbine, fueled by a portion of the gas or an alternative fuel source, generates electricity and hot exhaust gas. This exhaust gas is then directed into a heat exchanger, where it heats the high-pressure wellhead gas stream. This preheating process elevates the temperature of the wellhead gas, mitigating the risk of hydrate formation and other operational issues associated with low temperatures during expansion. The preheated gas is subsequently expanded in a geobaric expander, generating additional electrical power. The fuel for the gas turbine can be sourced from the gas stream, pipeline gas, or other fuels like diesel or kerosene.

Another embodiment utilizes multiple expanders in series to increase power generation and efficiency. In one embodiment, a two-stage geobaric expansion process. In this configuration, the gas undergoes expansion in two separate expanders. The cooled outlet of the first, higher-pressure expander is used to further cool the gas turbine exhaust, maximizing waste heat recovery. This two-stage expansion process allows for a higher gas throughput and a modest increase in overall efficiency compared to a single-stage expansion.

A further embodiment incorporates the injection of a hydrate inhibitor into the gas stream to further lower the outlet temperature and increase efficiency. This allows for colder outlet temperatures from the geobaric expander, increasing the available pressure ratio and thus the power output. Methanol injection may be used as it is relatively inexpensive and typically does not require recovery. This embodiment can be combined with other aspects described herein, such as the two-stage expansion, to further enhance efficiency. Alternatively, a further embodiment includes removing water vapor from the gas stream.

The system can be further modified by arranging multiple systems in series on the same gas stream. This configuration maximizes the cumulative power generated over the wellhead pressure drawdown period. As the wellhead pressure decreases, individual systems can be bypassed and taken out of service, ensuring optimal operation at varying pressure levels.

Turning now to the figures, FIG. 1 illustrates an embodiment of a system 100 for harnessing the energy potential of high-pressure wellhead gases. The system 100 integrates a gas turbine 102 and a geobaric expander 104 in a combined cycle configuration, the system 100 effectively recovers waste heat, mitigates hydrate formation issues, and achieves high electrical generation efficiencies. Generally, the gas turbine 102 can be a type of combustion engine, but it functions differently from traditional reciprocating engines. In one embodiment, the gas turbine 102 is a small gas turbine that generate power by burning fuel in a continuous combustion process. The gas turbine 102 includes air intake and compression stages. Air is drawn into the gas turbine 102 and compressed by a high-speed compressor. The compressed air is mixed with fuel (such as natural gas 112, diesel, or biogas) and burned in a combustion chamber. The high-temperature, high-pressure gases from combustion expand through the turbine, spinning it. This mechanical energy drives the compressor and an electric generator 114. The hot exhaust gases are released, and in some cases, their energy is recovered for additional efficiency (e.g., in a combined heat and power (CHP) system).

Air and fuel are reacted in the gas turbine 102 to produce power and hot exhaust gas. The gas turbine 102 and the geobaric expander 104 each drive an electric generator 114, 116. The exhaust gas is cooled in a gas-gas heat exchanger 106 that warms a high-pressure wellhead gas 108 stream to be sent through a geobaric expander 104. In this non-limiting example, the geobaric expander 104 discharges ~9.7 MMscf/d gas at ~60.4° F. (which is 10° F. above the predicted hydrate formation temperature at 1000 psig) into the pipeline. In this non-limiting example, the gas turbine 102 (e.g., a Capstone C200S) generates a net ~200 kW of electrical power, and the expansion turbine of the geobaric expander 104 generates ~254 kW electrical power. Roughly 54 Mscf/d of the gas (about 0.56%) is burned as fuel for the gas turbine 102. This particular wellhead gas would require no fuel burn to counteract the Joule-Thomson effect and avoid hydrate formation if produced conventionally, but other high-pressure gas streams with cooler wellhead temperatures may require process heat for conventional production; in that case, the LHV electrical efficiency of the system 100 can be judged based on the incremental fuel burn relative to the theoretical minimum fuel gas rate required in the conventional case (which, in practice, is usually not metered).

This innovative approach provides a compelling alternative to conventional methods, offering significant advantages in terms of power output, fuel efficiency, and environmental impact. The system's 100 adaptability to various wellhead conditions and fuel sources further enhances its practicality and appeal for a wide range of applications. The ability to further optimize the system 100 through variations such as two-stage expansion, hydrate inhibitor injection, or removal of water vapor described hereinbelow, provides additional flexibility and performance enhancements. The system 100 represents a significant advancement in geobaric power generation technology, offering a compelling solution for maximizing energy recovery and minimizing environmental impact in oil and gas operations.

In various embodiments, the combustion engine, such as a gas turbine 102, discharges its hot exhaust gas (e.g., at least 535° F.) into a heat exchanger 106. This heat exchanger 106 heats a high-pressure gas 108 stream (e.g., 3000 psig) from a relatively low wellhead temperature (e.g., 120° F.) to a substantially higher temperature (e.g., at least 200° F.) while cooling the exhaust gas to a substantially lower temperature (e.g., 155° F.). The heated gas stream 110 is then expanded in an expander 104, preferably an expansion turbine, to a substantially lower pressure (e.g., 1000 psig) and discharged into a pipeline. The system 100 effectively utilizes the gas turbine's exhaust heat, transforming a waste product into a valuable energy source. This synergistic approach significantly enhances the overall efficiency and economic viability of the system 100.

The gas turbine 102, fueled by a small portion of the gas or an alternative fuel source, operates on an open Brayton cycle. The hot exhaust gas from the gas turbine 102, typically at least 535° F., is directed into the heat exchanger 106. This heat exchanger 106 preheats the high-pressure wellhead gas, which serves as the working fluid for the geobaric expander 104. The high-pressure gas, typically around 3000 psig, enters the heat exchanger 106 at a relatively low temperature, often between 100° F. and 150° F. Generally, the high pressure of the gas stream, which may be approximately 3000 psig, is at least 20% higher than a lower pressure, which may be approximately 1000 psig.

As the gas absorbs heat from the gas turbine 102 exhaust, its temperature increases substantially, reaching at least 200° F. This preheating prevents hydrate formation at the outlet of the geobaric expander 104, which can impede the operation of the geobaric expander. Simultaneously, the gas turbine exhaust gas cools to a substantially lower temperature, around 155° F., maximizing heat recovery. The preheated high-pressure gas then enters the geobaric expander 104, where it expands to a lower pressure, typically around 1000 psig, generating power.

The geobaric combined cycle power generation system offers a novel approach to harnessing energy from high-pressure wellhead gases as part of a high-efficiency power plant. This innovative system 100 addresses the limitations of conventional geobaric power generation and gas turbines by integrating them into a combined cycle configuration.

This approach not only mitigates the "cold problem" associated with geobaric expansion but also enhances the efficiency of gas turbines, resulting in a highly efficient and environmentally friendly power generation solution. The heat exchanger 106 acts as the link between the gas turbine 102 and the geobaric expander 104, facilitating efficient heat transfer and enabling the system's 100 combined cycle operation. This integration of these components is a factor in the system's improved performance.

The gas turbine 102, fueled by a small portion of the gas or an alternative fuel source (such as pipeline gas 112, diesel, or kerosene), operates on an open Brayton cycle. Its hot exhaust gas, typically at least 535° F., is directed into the heat exchanger 106. This heat exchanger 106 preheats the high-pressure wellhead gas, which serves as the working fluid for the geobaric expander 104. The high-pressure gas, typically around 3000 psig, enters the heat exchanger 106 at a relatively low temperature, often between 100° F. and 150° F. The choice of fuel source for the gas turbine 102 can be adapted based on availability and cost considerations. The fuel gas for the gas turbine 102 is typically conditioned using a gas conditioning skid, which reduces pressure and removes liquids and solids.

In various embodiments, the system 100 includes at least two components: a gas turbine 102 and a geobaric expander 104. The gas turbine 102, fueled by a small portion of the gas or an alternative fuel source, operates on an open Brayton cycle. The hot exhaust gas from the gas turbine 102, typically at least 535° F., is then directed into a heat exchanger 106. This heat exchanger 106 preheats the high-pressure wellhead gas, which is the working fluid for the geobaric expander 104. By preheating the gas, the system 100 avoids the formation of methane clathrate hydrates, a common operational challenge in geobaric systems. This preheating also allows for a greater pressure drop across the geobaric expander 104, maximizing power output.

The high-pressure gas, typically around 3000 psig, enters the heat exchanger 106 at a relatively low temperature, often between 100° F. and 150° F. As the gas absorbs heat from the gas turbine exhaust, its temperature increases substantially, reaching at least 200° F. This preheating process prevents the formation of clathrate hydrates, which can impede the operation of the geobaric expander 104. Simultaneously, the gas turbine exhaust gas is cooled to a substantially lower temperature, around 155° F., maximizing heat recovery. The expanded gas, now at pipeline pressure and a temperature suitable for pipeline transport, eliminates the need for further processing or rewarming. This streamlines operations and reduces infrastructure requirements.

The preheated high-pressure gas then enters the geobaric expander 104, where it expands to a lower pressure, typically around 1000 psig, generating power. This expansion process drives an electric generator 116, converting the geobaric energy into electricity. The expanded gas, now at pipeline pressure and a temperature above the hydrate formation point, is discharged into the pipeline. The simulated efficiency of 76.4% demonstrates the system's 100 potential to rival conventional large-scale combined cycle turbines. This efficiency underscores the system's 100 innovative approach to energy recovery.

FIG. 2 is a graph 200 showing power based on wellhead pressure drawdown. The non-limiting operating conditions listed above describe the system 100 of FIG. 1 operating on a new dry Utica well producing gas at 9000 psig and 160° F. High-pressure wells are customarily produced at a constant flow rate while the wellhead remains at excess pressure; this results in a linear wellhead pressure drawdown over time. However, turbines and other expanders operate most effectively under constant operating conditions, so in practice the designer of a system according to the disclosure described herein may choose a geobaric expander inlet pressure that strikes a balance between power production and length of service on any given wellhead. Wellhead pressure in excess of the geobaric expander inlet pressure is then throttled using a pressure control valve; this generally causes the gas stream entering the gas-gas heat exchanger to vary in temperature over time. In FIG. 2, the wellhead temperature is assumed to be a constant 160° F. regardless of pressure, and the effect of gas pressure reduction upstream of the system is shown. The combustion turbine (e.g., a Capstone C200S) may consume a fixed rate of fuel gas, so its net power, as well as the LHV flow rate of fuel gas, are constant. Geobaric power rises as the wellhead draws down from 9000 psig to 3000 psig, but only slightly; the purpose of this graph 200 is meant to illustrate the near-constant power production of the system 100 despite the large change in wellhead pressure from start to finish of the system's service on any given wellhead.

The efficiency of the combined cycle system can surpass that of conventional gas turbines (typically no more than 33%) and even rival large-scale combined cycle gas turbines used in centralized power generation. In a simulated scenario using a Capstone C200S gas turbine, the system achieved a lower heating value (LHV) electrical efficiency of approximately 76.4%. This high efficiency stems from the effective utilization of waste heat from the gas turbine, which would otherwise be lost in the exhaust. The system's performance is influenced by factors such as wellhead pressure, wellhead temperature, and the chosen geobaric expander inlet pressure. FIGS. 2-6 illustrate the impact of these factors on power production and efficiency.

FIG. 3 is a graph 300 showing lower heating value (LHV) electrical efficiency as a function of wellhead pressure drawdown. The combustion turbine electrical power and total electrical power shown in FIG. 1 are each divided by the LHV flow rate of fuel gas consumed; this is the standard method of reckoning the thermal efficiency of a gas-burning heat engine. As a benchmark, the LHV electrical efficiency of the most advanced large-scale gas turbine (a General Electric 9HA in a 2×1 combined-cycle configuration) is shown; the system 100 shown in FIG. 1 can achieve higher LHV electrical efficiencies due to the availability of pressure letdown gas; the GE 9HA uses two stages of steam-turbine expansion to recover waste heat from the combustion exhaust instead.

FIG. 4 is a graph 400 showing outlet stream temperatures as functions of wellhead pressure drawdown. This is for the same non-limiting example system 100 described in the FIGS. 1-3. The exhaust gas from the combustion turbine 102 (e.g., the Capstone C200S) is a uniform 536° F. per the manufacturer's specifications; the gas-gas heat exchanger 106 lowers this temperature to the trend shown above. The temperature to which the combustion turbine 102 exhaust is lowered is a qualitative indication of how much waste heat has been recovered by the geobaric expander 104. Less waste heat is recovered at lower wellhead pressures, but the overall process has a higher LHV electrical efficiency at lower wellhead pressures because the gas stream at these lower wellhead pressures (again, assuming a constant wellhead temperature) has a higher enthalpy to begin with. The gas rate through the geobaric expander 104 is s adjusted so that the coldest outlet temperature of the geobaric turbine will be 10° F. above the predicted clathrate hydrate formation temperature. This generally corresponds to the highest wellhead pressure.

FIG. 5 is a graph 500 showing the effect of wellhead temperature on maximum geobaric expander throughput and maximum time-averaged total LHV electrical efficiency. The operating conditions described in FIGS. 1-4 are used as a base case, and wellhead temperature is varied. In all cases, the combustion turbine (again, a Capstone C200S) produces 200 kW electrical power and an exhaust gas of ~535° F. The hotter the wellhead temperature, the less heat the geobaric expander's process stream needs in order to stay at least 10° F. above clathrate hydrate formation temperature at all times. Thus, hotter wellhead temperatures allow waste heat from any given combustion turbine to be recovered by a larger gas stream, increasing the geobaric power produced and, as a result, the total LHV electrical efficiency. Note that LHV electrical efficiencies over 100% do not imply that the system disclosed herein is a perpetual motion machine; rather, they simply indicate that the electrical power produced exceeds the LHV of the fuel gas consumed by the system. (By this reckoning, any power plant that burns no fuel, such as a wind farm or hydroelectric dam, has an infinite LHV electrical efficiency.)

FIG. 6 is a graph 600 showing the effect of geobaric expander inlet pressure on maximum geobaric expander throughput and maximum time-averaged total LHV electrical efficiency. The operating conditions described in FIGS. 1-4 are used as a base case, and the geobaric expander 104 inlet pressure is varied. In all cases, the combustion turbine 102 (e.g., a Capstone C200S) produces 200 kW electrical power and an exhaust gas of ~535° F. For a geobaric expander 104 inlet pressure substantially equal to pipeline pressure, no geobaric power is available, and the LHV electrical efficiency is equal to that of the gas turbine 102 operated by itself (~33%). As the geobaric expander 104 inlet pressure is increased, more and more geobaric power is available due to the increasing available pressure ratio; however, this effect plateaus at an inlet pressure of roughly 1200 psig and gently declines beyond that point. This suggests that, for the given wellhead conditions, a geobaric expander ought to have a design inlet pressure no less than 1200 psig. Higher pressures than this may be advantageous to the operator for generating greater amounts of power per wellpad, as the total gas rate on any given wellpad is determined by reservoir characteristics and cannot be arbitrarily high.

The system's 100 high efficiency stems from the effective utilization of waste heat from the gas turbine 102. By preheating the geobaric expander's 104 working fluid, the system 100 recovers a significant portion of the heat that would otherwise be lost in the gas turbine exhaust. This heat recovery not only improves the overall efficiency but also mitigates the need for additional fuel to maintain the geobaric expander's outlet temperature above the hydrate formation point.

The geobaric combined cycle system 100 offers several advantages over alternative approaches to geobaric power generation. It eliminates the need for expensive and complex gas drying and rewarming processes that have been considered in other geobaric power generation designs. The system's compact and modular design allows for easy installation and operation on well pads, minimizing infrastructure requirements. Furthermore, the system's high efficiency reduces fuel consumption and greenhouse gas emissions compared to traditional gas-burning generators.

The potential applications of this technology are vast. It can be deployed on well pads to generate electricity for on-site operations, reducing reliance on grid power and minimizing transmission losses. The system 100 can also be used in remote locations where access to grid power is limited or unavailable. Furthermore, the technology can be scaled to accommodate different gas flow rates and wellhead pressures, making it adaptable to various well conditions.

Several variations of the system 100 can further enhance its performance and efficiency. One variation is shown in FIG. 7, where two geobaric expanders are connected in series, allowing for greater heat recovery from the gas turbine exhaust and increased power generation. FIG. 7 illustrates an embodiment of a system 700 for harnessing the energy potential of high-pressure wellhead gases using two geobaric expanders connected in series. The system 700 is a variation of the system 100 described in FIGS. 1-6. Two geobaric expanders 104, 702 are used; the cooled outlet of the first (higher-pressure) expander 702 is used to lower the combustion turbine exhaust to a greater degree than is possible in the system 100 described in FIG. 1, thus recovering more waste heat. For the same non-limiting operating conditions as those described in FIGS. 1-4, the system 700 of FIG. 7 is able to harness the geobaric power of a slightly higher gas stream (~12.0 MMscf/d versus ~9.7 MMscf/d) and thus achieve a modestly higher time-averaged LHV electrical efficiency (82.8% versus 76.4%). The overall pressure ratio of geobaric expansion is the same in both cases; the higher-pressure expander's inlet pressure is 3000 psig, and the interstage pressure may be chosen in order to be at least 10° F. above the predicted solids formation temperature at any time (in this non-limiting example, ~1900 psig). The increased LHV electrical efficiency should be weighed against the incremental capital costs associated with the additional geobaric expander 702. Still, this potential incremental gain in efficiency is much larger than current efficiency gains achieved by state-of-the-art combined-cycle gas turbines such as the GE 9HA (which are often on the order of 1% or less).

The choice of geobaric expander inlet pressure is a design consideration. A higher inlet pressure yields a greater pressure ratio and potentially higher power output but shortens the system's operational lifespan on a given wellhead. Conversely, a lower inlet pressure extends the service life but reduces power output. The optimal inlet pressure balances these factors, depending on well characteristics and economic considerations. Wellhead temperature also significantly influences system performance.

Higher wellhead temperatures require less preheating to avoid hydrate formation, allowing for greater gas throughput and increased efficiency. Lower wellhead temperatures, conversely, limit throughput and efficiency. The adaptability of the systems 100, 700 shown in FIGS. 1 and 7 to various wellhead conditions and gas characteristics offers flexibility and versatility. This adaptability makes the system 100, 700 suitable for a wide range of well types and operating conditions, maximizing its potential applications in diverse environments.

The choice of geobaric expander inlet pressure may be a design consideration, balancing power output and service life. A higher inlet pressure yields greater power but shortens the system's 100, 700 operational lifespans on a given wellhead. Conversely, a lower inlet pressure extends the service life but reduces power output. The optimal inlet pressure depends on well characteristics and economic considerations. Wellhead temperature also influences system performance, with higher temperatures allowing for greater throughput and efficiency due to reduced preheating requirements. The adaptability of the systems 100, 700 to various wellhead conditions and gas characteristics makes it suitable for a wide range of well types and operating conditions The combined cycle systems 100, 700 achieve significantly higher efficiencies compared to standalone gas turbines or conventional geobaric generators. The systems 100, 700 can achieve efficiencies rivaling large-scale combined cycle gas turbines, exceeding 66% in certain scenarios. This high efficiency makes the systems 100, 700 a more environmentally friendly alternative to conventional gas-fired power generation.

The preheating of the gas 108 stream by the gas turbine exhaust addresses the "cold problem" of geobaric power generation. The elevated temperature of the expander inlet ensures that the outlet temperature remains above the hydrate formation temperature and within the operational limits of downstream equipment. The gas turbine 102, fueled by a small portion of the gas stream (e.g., less than 1%), generates electrical power by driving an electric generator 114 while providing the necessary heat for the geobaric expander. The geobaric expander 104, also driving an electric generator 116, further increases the overall power output of the systems 100, 700.

This "cold problem" arises from the thermodynamic properties of gases, where expanding high-pressure gas without external heat input leads to a substantial temperature drop. This temperature decrease can have detrimental effects on the efficiency and operability of geobaric systems.

Another variation of a system for harnessing the energy potential of high-pressure wellhead gases using geobaric expanders involves injecting a hydrate inhibitor into the gas stream or removing water vapor from the gas stream, enabling the geobaric expander to operate at lower outlet temperatures and further increasing efficiency. FIG. 8 illustrates an embodiment of a system 800 for harnessing the energy potential of high-pressure wellhead gases that involves injecting a hydrate inhibitor 802 into the gas 108 stream or removing water vapor from the gas stream. This allows for colder outlet temperatures from the geobaric expander 104, increasing the power output by raising the throughput or the pressure ratio of the geobaric expander. Methanol injection is a preferred method due to its low cost and lack of recovery requirements. This embodiment can be combined with other aspects, such as the two-stage expansion shown in FIG. 7, to further enhance efficiency. This flexibility in design allows for customization based on specific operational needs and economic constraints.

Another embodiment involves using pipeline gas 112, or another source of gas located between the wellhead and the pipeline, as a fuel for the gas turbine. FIG. 9 illustrates an embodiment of a system 900 for harnessing the energy potential of high-pressure wellhead gases that involves using pipeline gas 112 as a fuel for the gas turbine 102. The pipeline gas 112 is conditioned by a conditioning system 902 (e.g., conditioning skid) and is then used as the fuel source for the gas turbine 102. The pipeline natural gas conditioning system 902 is designed to process and condition natural gas extracted from the pipeline to meet the specific quality requirements of gas turbines 102, which are small gas turbines used for power generation.

The conditioning system 902 typically includes the following components and processes. A gas inlet pressure regulator reduces the pipeline pressure to the level suitable for gas turbine 102 operation and ensures consistent gas flow and pressure stability. A filtration system may include particulate filters to remove dust, dirt, and solid particles from the gas and coalescing filters to extract liquid hydrocarbons, oil, and water droplets from the gas stream. Filters protect downstream components from fouling or damage. A moisture removal (dehydration) may include a desiccant dryer to adsorb water vapor to prevent condensation and freezing in the gas turbine 102 or membrane dehydrators that use selective membranes to remove water vapor. Hydrocarbon separation removes heavier hydrocarbons that could condense at low temperatures or affect combustion stability. Separators or scrubbers may be employed to achieve this. A heating system ensures the gas temperature is raised above its dew point to prevent condensation during pressure reduction. The heating system may use electric or heat exchanger-based heaters. Sulfur removal removes hydrogen sulfide ($H_2S$) and other sulfur compounds to protect the gas turbine and meet environmental regulations. This is typically achieved through chemical adsorption or catalyst-based processes. Gas analysis and monitoring ensures the gas composition is within the acceptable range for the gas turbine 102 and monitors methane content, calorific value, and contaminants like $CO_2$ and $N_2$. A flow control system regulates the gas flow rate to match the gas turbine's 102 demand. The flow control system may include automated control valves and flow meters.

The conditioning system 902 process flow includes pipeline gas 112 entry where gas enters the system 900 from the pipeline under high pressure. Pressure regulation reduces pressure to gas turbine-suitable levels. Filtration passes the gasses through particulate and coalescing filters to remove impurities. Moisture and hydrocarbon separation subjects the gas to dehydration and separation processes to ensure it is free of water and heavy hydrocarbons. Sulfur removal and heating, if required, removes sulfur, and the gas is heated to avoid freezing during the pressure drop. Gas analysis monitors the conditioned gas for purity and energy content, Conditioned gas is supplied to the gas turbine 102 for combustion and power generation.

The benefits of the conditioning system 902 include protecting equipment to reduce the risk of damage to the gas turbine 102 from contaminants or pressure fluctuations. It optimizes performance to ensure the gas meets the quality specifications for efficient combustion. Regulatory compliance removes harmful substances to meet environmental and safety standards. This system 900 adapts raw pipeline gas 112 to the precise requirements of gas turbines 102, ensuring reliability and efficiency in power generation applications. Nevertheless, generally speaking, the operation of turbines and gas turbines is relatively unaffected by the type of fuel burned as long as the heating value is high enough for the intended application. Accordingly, in other embodiments, a gas turbine may be selected that does not require pretreatment of the fuel it burns.

Another embodiment involves arranging multiple systems in series on the same gas stream. FIG. 10 illustrates an embodiment of a system 1000 arranging multiple systems 1002, 1004 in series on the same gas 108 stream. In order to maximize the cumulative amount of electrical power (over the course of the wellhead pressure drawdown from initial pressure to pipeline pressure) generated according to the systems 100, 700, 800, 900, 1000 disclosed herein, an operator may install multiple systems 1002, 1004, as described in FIGS. 1, 7, 8, 9, and 10, in series on the same gas 108 stream. Each system 1002, 1004 consumes a small amount of fuel, reduces the pressure of the gas 108 stream, and generates power. When the wellhead pressure falls below the design inlet pressure of the highest-pressure system in operation, it is bypassed and taken out of service, and the wellhead pressure is throttled to the design inlet pressure of the next-lowest-pressure system. This configuration maximizes cumulative power generation over the wellhead pressure drawdown period. As wellhead pressure decreases, individual systems can be bypassed and taken out of service, ensuring optimal operation at varying pressure levels. This modular approach allows for scalability and adaptability to changing well conditions, maximizing power generation throughout the well's lifespan.

FIG. 11 is an embodiment of a method 1100 of generating power from a high-pressure gas stream. The method 1100 includes generating 1102 power and exhaust gas using a combustion engine. The method 1100 also includes heating 1104 the high-pressure gas stream using the exhaust gas from the combustion engine. The method also includes expanding 1106 the heated high-pressure gas stream to a lower pressure using an expander.

Implementations may include one or more of the following features. The method 1100 of generating power from a high-pressure gas stream where the combustion engine is a gas turbine. The method 1100 of generating power from a high-pressure gas stream where the expander is an expansion turbine. The method 1100 may include generating power by the expander. The method 1100 may include injecting a hydrate inhibitor into the gas stream or removing water vapor from the gas stream. The method 1100 of generating power from a high-pressure gas stream where the gas turbine and the expansion turbine each drive an electric generator. The method 1100 of generating power from a high-pressure gas stream where the gas turbine uses a portion of the gas stream as fuel. The method 1100 may include conditioning pipeline gas and fueling the gas turbine with the conditioned pipeline gas. The method 1100 may include the expander driving an electric generator. The method 1100 may include receiving the high-pressure gas stream by a second expander and expanding the high-pressure gas stream into the heat exchanger. The method 1100 may include fueling the gas turbine with a portion of the gas stream.

In various embodiments, the systems 100, 700, 800, 900, 1000 described in FIGS. 1, 7, 8, 9, and 10 and the method 1100 described in FIG. 11 address the formation of clathrate hydrates, ice-like structures that can block pipelines and equipment. Hydrates are thermodynamically favored at lower temperatures in the presence of water, which is often found in natural gas streams. Conventional approaches to address this involve limiting the pressure drop or implementing expensive dehydration and rewarming processes. These methods either restrict power output or increase system complexity and cost.

Another challenge is the low enthalpy of high-pressure wellhead gases. While the high pressure suggests significant energy potential, the relatively low temperature of the gas limits the actual energy available for extraction. Expanding this gas further reduces its temperature, exacerbating the risk of hydrate formation and potentially damaging downstream equipment not designed for such low temperatures.

The innovative solution proposed addresses the cold problem by utilizing the waste heat from the gas turbine 102. Gas turbines, small-scale combustion turbines, are commonly used for distributed power generation but suffer from relatively low efficiency, resulting in warm exhaust gases. This "waste" heat, typically around 535° F., becomes a valuable resource in the combined cycle systems 100, 700, 800, 900, 1000 described in FIGS. 1, 7, 8, 9, and 10 and the method 1100 described in FIG. 11.

As described above, the gas turbine exhaust is directed into a heat exchanger 106, where it preheats the high-pressure wellhead gas before it enters the geobaric expander 104. This preheating raises the temperature of the wellhead gas, typically from around 120° F. to at least 200° F., while simultaneously cooling the exhaust gas to a lower temperature, around 155 OF. This heat exchange efficiently recovers waste heat and addresses the cold problem in several ways.

First, the elevated inlet temperature of the geobaric expander 104 raises the expander outlet temperature, mitigating the risk of hydrate formation. This eliminates the need for expensive dehydration processes and allows for a larger pressure drop, maximizing power output.

Second, the preheating increases the enthalpy of the wellhead gas, making more energy available for extraction in the expander.

Third, maintaining a higher temperature throughout the system 100, 700, 800, 900, 1000 described in FIGS. 1, 7, 8, 9, and 10 and the method 1100 described in FIG. 11 protects downstream equipment, such as carbon steel pipelines, which are not designed for extremely low temperatures. This ensures the safety, reliability, and longevity of the system.

The choice of geobaric expander 104 inlet pressure is also a design consideration. A higher inlet pressure results in a greater pressure ratio and potentially higher power output, but it also shortens the operational lifespan of the system on a given wellhead. Conversely, a lower inlet pressure extends the service life but reduces the power output. The optimal inlet pressure balances these factors and depends on the specific well characteristics and economic considerations.

The wellhead temperature influences the system's performance. Higher wellhead temperatures require less preheating to avoid hydrate formation, allowing for a larger gas throughput and increased efficiency. Conversely, lower wellhead temperatures limit the throughput and power generation.

The systems 100, 700, 800, 900, 1000 described in FIGS. 1, 7, 8, 9, and 10 and the method 1100 described in FIG. 11 provide several advantages over other geobaric power generation methods. By utilizing the waste heat from the gas turbine 120, the system significantly increases the fuel efficiency, rivaling that of large-scale combined cycle power plants. The preheating process eliminates the need for expensive and complex gas drying and rewarming procedures, simplifying the system design and operation. Furthermore, the system can be adapted to various wellhead conditions and gas characteristics, offering flexibility and versatility.

The systems 100, 700, 800, 900, 1000 described in FIGS. 1, 7, 8, 9, and 10 and the method 1100 described in FIG. 11 also address the limitations of gas turbines. By integrating the gas turbine into a combined cycle, the fuel efficiency is significantly improved, overcoming the inherent inefficiency of the Brayton cycle. The system effectively utilizes the gas turbine's exhaust heat, which would otherwise be wasted, maximizing energy recovery.

The systems 100, 700, 800, 900, 1000 described in FIGS. 1, 7, 8, 9, and 10 and the method 1100 described in FIG. 11 can be further optimized by incorporating various modifications and enhancements. For instance, the heat exchanger 106 design can be tailored to maximize heat transfer efficiency. The expander 104 can be selected based on the specific operating conditions and desired pressure ratio. The control system can be designed to optimize performance and maintain stable operation.

The fuel source for the gas turbine 102 can be varied depending on availability and cost. While a portion of the gas 108 is a convenient and readily available fuel source, alternative fuels such as pipeline gas 112, diesel, or kerosene can also be used. The fuel conditioning system 902 can be adapted to handle different fuel types and ensure optimal combustion.

The systems 100, 700, 800, 900, 1000 described in FIGS. 1, 7, 8, 9, and 10 and the method 1100 described in FIG. 11 can be integrated with other processes on the drilling pad. For example, the geobaric expander 104 can be coupled with a process that requires a cooling duty, further enhancing overall efficiency. The system can also be used in conjunction with renewable energy sources, such as solar panels, to create a hybrid power generation system.

The systems 100, 700, 800, 900, 1000 described in FIGS. 1, 7, 8, 9, and 10 and the method 1100 described in FIG. 11 applicable to a wide range of well types and operating conditions. It can be used with both high-pressure and low-pressure wells, as well as wells with varying gas compositions and temperatures. The system can be scaled to match the specific power requirements of on-site equipment. Low-pressure in this context is a pressure that is in excess of pipeline pressure.

The geobaric combined cycle system offers a compelling solution for on-site power generation, reducing reliance on grid power and associated transmission losses. Its modular design facilitates easy installation and integration into existing infrastructure. This innovative system offers a sustainable and efficient solution for harnessing the energy potential of high-pressure wellhead gases, contributing to a cleaner and more efficient energy landscape. It represents a significant advancement in geobaric power generation technology, offering both economic and environmental benefits.

The benefits of the system 100, 700, 800, 900, 1000 described in FIGS. 1, 7, 8, 9, and 10 and the method 1100 described in FIG. 11 extend beyond increased efficiency and hydrate mitigation. It eliminates the need for costly and complex gas drying and rewarming processes, simplifying system design and operation. The compact, modular design facilitates easy installation and operation on well pads, minimizing infrastructure requirements. Furthermore, the reduced fuel consumption and greenhouse gas emissions compared to traditional methods contribute to a more environmentally friendly power generation solution.

The potential applications of this technology are vast, ranging from on-site power generation on well pads to remote locations with limited grid access. The system's scalability allows it to accommodate different gas flow rates and wellhead pressures, making it adaptable to various well conditions. This versatility positions the system as a valuable solution for diverse energy needs, contributing to a more sustainable and efficient energy landscape.

One general aspect includes a system for generating power from a high-pressure gas stream. The system also includes a combustion engine configured to generate power and exhaust gas. The system also includes a heat exchanger to receive the exhaust gas from the combustion engine and heat a high-pressure gas stream. The system also includes an expander to receive the heated high-pressure gas stream and to expand the heated high-pressure gas stream to a lower pressure gas stream.

Some implementations may include a system for generating power from a high-pressure gas stream, featuring a gas turbine as the combustion engine and an expansion turbine as the expander. The system may incorporate a fuel conditioning system to prepare fuel for the combustion engine and a gas-gas heat exchanger. Both the combustion engine and the expander drive electric generators. The exhaust gas reaches temperatures that are higher than the high-pressure gas stream pressure, while the high-pressure gas stream is heated. The high pressure of the gas stream has an initial pressure that is higher than a downstream gas pressure. Additionally, the system may include a second expander to receive and expand the high-pressure gas stream into the heat exchanger. The system also includes a second combustion engine to generate power and exhaust gas, a second heat exchanger to receive the exhaust gas from the second combustion engine and heat the lower pressure gas stream from the expander, and a second expander to receive the heated lower pressure gas stream from the second heat exchanger and to expand the heated lower pressure gas stream to a lower pressure gas stream.

One general aspect includes a method of generating power from a high-pressure gas stream. The method includes generating power and exhaust gas using a combustion engine. The method also includes heating the high-pressure gas stream using the exhaust gas from the combustion engine. The method also includes expanding the heated high-pressure gas stream to a lower pressure gas stream using an expander.

Some implementations may include a method for generating power from a high-pressure gas stream using a gas turbine as the combustion engine and an expansion turbine as the expander. The method may involve generating power with the expander and injecting a hydrate inhibitor into the gas stream or removing water vapor from the gas stream. The method may involve removing water vapor from the gas stream. Both the gas turbine and the expansion turbine drive electric generators. Additionally, the gas turbine utilizes a portion of the gas stream as fuel.

One general aspect includes a system for increasing the efficiency of a gas turbine. The system also includes a gas turbine to generate power and exhaust gas. The system also includes a heat exchanger to receive the exhaust gas from the gas turbine and to heat a high-pressure gas stream. The system also includes an expansion turbine to receive the heated high-pressure gas stream and to expand the heated high-pressure gas stream to a lower pressure gas stream, where the expansion turbine generates additional power.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted being prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system comprising:
a combustion engine to output exhaust gas and mechanical work;
a heat exchanger to transfer heat between the exhaust gas received from the combustion engine and a high-pressure gas stream received from a wellhead; and
an expander to expand the high-pressure gas stream received from the heat exchanger to reduce a pressure of the high-pressure gas stream to a first reduced pressure.

2. The system of claim 1, wherein the combustion engine is a gas turbine.

3. The system of claim 1, wherein the expander is an expansion turbine.

4. The system of claim 1, comprising a fuel conditioning system configured to condition fuel for the combustion engine.

5. The system of claim 1, wherein the combustion engine drives an electric generator.

6. The system of claim 1, wherein the expander drives an electric generator.

7. The system of claim 1, wherein a temperature of the exhaust gas is greater than a temperature of the high-pressure gas stream.

8. The system of claim 1, wherein the high-pressure gas stream is heated.

9. The system of claim 1, comprising:
a second combustion engine to output exhaust gas and mechanical work;
a second heat exchanger to transfer heat between the exhaust gas received from the second combustion engine and the high-pressure gas stream received from the expander; and
a second expander to to expand the high-pressure gas stream received from the second heat exchanger to reduce the pressure of the high-pressure gas stream to a second reduced pressure that is less than the first reduced pressure.

10. The system of claim 1, comprising a second expander to receive the high-pressure gas stream and to expand the high-pressure gas stream into the heat exchanger.

11. A method comprising:
operating a combustion engine to output exhaust gas and mechanical work;
transferring heat between a high-pressure gas stream of a wellhead and the exhaust gas of the combustion engine to heat the high-pressure gas stream; and
expanding the heated high-pressure gas stream to a lower pressure gas stream via an expander.

12. The method of claim 11, wherein the combustion engine is a gas turbine.

13. The method of claim 11, wherein the expander is an expansion turbine.

14. The method of claim 11, comprising driving an electric generator via the expander.

15. The method of claim 11, comprising injecting a hydrate inhibitor into the gas stream.

16. The method of claim 11, comprising removing water vapor from the gas stream.

17. A system for increasing the efficiency of a gas turbine, the system comprising:
a gas turbine to output exhaust gas and mechanical work;
a heat exchanger to transfer heat between the exhaust gas received from the gas turbine and a high-pressure gas stream received from a wellhead to heat the high-pressure gas stream; and
an expansion turbine to expand the heated high-pressure gas stream received from the heat exchanger to a lower pressure gas stream, wherein the expansion turbine outputs additional mechanical work.

18. The system of claim 17, wherein the gas turbine and the expansion turbine each drive an electric generator.

19. The system of claim 17, wherein the gas turbine uses a portion of the gas stream as fuel.

* * * * *